UNITED STATES PATENT OFFICE.

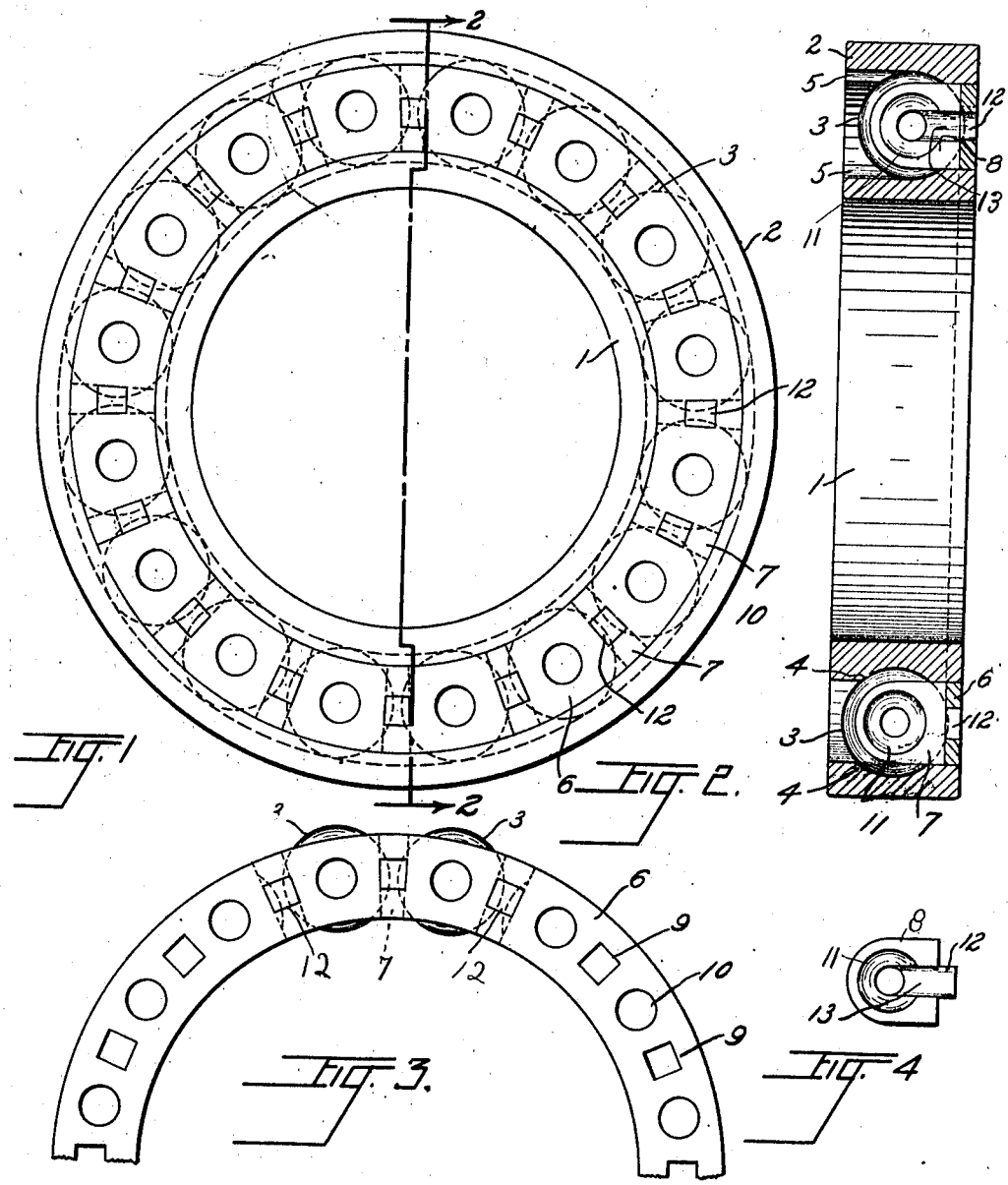

STEFAN SCHNEIDER, OF CHICAGO, ILLINOIS.

BALL-BEARING AND RETAINER THEREFOR.

978,223.

Specification of Letters Patent.   Patented Dec. 13, 1910.

Application filed February 2, 1910.  Serial No. 541,430.

*To all whom it may concern:*

Be it known that I, STEFAN SCHNEIDER, a subject of the Emperor of Germany, and residing at Chicago, in the county of Cook and State of Illinois, have invented a new and useful Improvement in Ball-Bearings and Retainers Therefor, of which the following is a complete specification.

The main objects of this invention are to provide a ball bearing having a ball retainer adapted to hold the balls out of contact with each other and which is so constructed that the space between adjacent balls is reduced to a minimum; to provide a ball retainer for ball bearings which is adapted to reduce the internal friction of the bearing and permit approximately 95% of the ball race to be occupied by balls; and to provide a ball bearing having a very high degree of efficiency and which is not liable to get out of repair.

A specific construction embodying the invention is illustrated in the accompanying drawings, in which:
Figure 1 is an end elevation of a bearing embodied in this invention. Fig. 2 is a section taken on line 2—2 of Fig. 1. Fig. 3 is a fragmentary, side elevation of the ball retainer with part of the spacers removed.
Fig. 4 is a side elevation of the spacer to be inserted last when assembling the bearing.

In the construction shown, two annular bearing members or collars 1 and 2 are provided, and are of different diameters, so that when one is within the other they will be spaced a sufficient distance apart to receive the balls 3. The collars 1 and 2 are each provided in their adjacent faces with a peripheral groove 4, which grooves form the ball race. Each collar is provided with a transverse groove 5 extending from one edge of the collar to the ball race, and when said grooves 5 are in register, that is, when they are bisected by coinciding radii of the collars, they permit the balls to be inserted into or removed from the ball race.

The ball retainer comprises a ring 6 and ball spacers 7 and 8 mounted thereon. The ring is of such internal and external diameters as to permit it to enter between the edges of the collars opposite from the grooves 5, and without contacting with the collars. The ring is provided with a plurality of angular apertures 9 therein, which are spaced equal distances apart, and alternating therewith are a plurality of countersunk apertures or seats 10 for the balls. The spacers each comprise a plate of metal which extends inwardly from the ring 6 between the collars, and is provided in each side with a countersunk seat 11 for the balls. The seats 11 are of such depth that they permit contiguous balls to lie very closely together with only sufficient space between them to prevent the balls from rubbing against each other. The spacers have their lateral faces, or those adjacent to the balls, lying in planes intersecting at the axis of the collars, and each seat 11 has its axis at a right angle to the face in which it is situated, so that it conforms to the ball and reduces the friction of the ball therein to a minimum.

Each spacer is provided at its end adjacent to the ring 6 with an angular stud 12 which is inserted in one of the apertures 9 and is riveted over to hold the spacer in place. Inasmuch as the studs 12 and the apertures 9 are angular the spacers are prevented from turning on the ring and are always held with their lateral faces lying in planes coinciding with radii of the collars.

In assembling the retainer, one spacer is first secured to the ring 6, then a ball is placed next to the spacer and the next spacer is secured in place to hold the ball, and so on, until the last spacer 8 is reached. The spacer 8 is identical to the spacers 7, with the exception that its countersunk seats 11 have lateral extensions 13 which extend to the end of the spacer adjacent to the ring to enable the spacer to be inserted between the last balls.

The operation of the construction shown is as follows: In assembling the device the retainer ring is inserted between the collars and the balls and spacers are assembled on the ring, the balls being inserted through the grooves 5 into the raceway. When one collar is held stationary and the other is rotated, the balls travel in the raceway and move the retainer therewith. Inasmuch as the retainer does not bear against the collars it will move freely with the balls and is subjected to but very slight strain or wear. The spacers provide individual pockets for the balls, and since they are comparatively thin and have countersunk seats for the balls they permit the insertion of a maximum amount of balls in the bearing. Should one of the balls break the bearing can still be run without danger until another ball can be inserted.

When inserting a new ball, one of the spacers adjacent to where the ball is to be inserted is removed and the ball is inserted, and a spacer 8 is then inserted between the balls and secured in place.

Obviously a bearing constructed in accordance with this invention will run with a minimum amount of resistance since a maximum amount of balls may be utilized in a given size of bearing. Obviously also many details of the form and construction may be varied or omitted without departing from the scope of the claims.

I claim:

1. A ball bearing, comprising an inner and an outer bearing member, a ring between said members, a plurality of spacers removably secured on said ring, and balls between said spacers, each spacer having cup shaped seats in its bearing faces, and one of said spacers having a groove extending from each seat to its inner end whereby the spacer may be inserted between the balls and lock the balls in place.

2. A ball bearing, comprising a pair of annular bearing members, a ring interposed between said members, and a plurality of spacers having studs on their inner ends adapted to be rigidly but removably secured to said ring, each spacer having countersunk seats in its bearing faces, and one of said spacers having grooves extending from its seats to the outer end of its stud.

3. A ball bearing, comprising an outer and an inner annular bearing member having ball races in their contiguous faces, a ring interposed between said members and having a plurality of alternately arranged angular apertures and countersunk seats, balls in said seats, and spacers having angular studs rigidly but removably secured in said angular apertures, and one or more of said spacers having longitudinal grooves extending from the outer end of its stud to the center of the spacer.

In testimony whereof I have hereunto subscribed my name in the presence of two witnesses.

STEFAN SCHNEIDER.

Witnesses:
CARL RATHUT,
FRITZ HENSELMANN.